US010489320B2

(12) United States Patent
Li (10) Patent No.: US 10,489,320 B2
(45) Date of Patent: Nov. 26, 2019

(54) STORAGE APPARATUS ACCESSED BY USING MEMORY BUS (71) Applicant: HUAWEI TECHNOLOGIES CO., LTD., Shenzhen (CN)

(72) Inventor: Yansong Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/834,016

(22) Filed: Dec. 6, 2017

(65) Prior Publication Data

US 2018/0113826 A1 Apr. 26, 2018

Related U.S. Application Data (63) Continuation of application No. PCT/CN2016/070062, filed on Jan. 4, 2016.

(30) Foreign Application Priority Data

Jun. 6, 2015 (CN) .......................... 2015 1 0308517

(51) Int. Cl.
G06F 13/28 (2006.01)
G06F 13/40 (2006.01)
(Continued)

(52) U.S. Cl.
CPC ............ *G06F 13/28* (2013.01); *G06F 3/0622* (2013.01); *G06F 3/0659* (2013.01); (Continued)

(58) Field of Classification Search
None
See application file for complete search history.

(56) References Cited

U.S. PATENT DOCUMENTS 8,006,045 B2  8/2011  Dupaquis et al.
8,359,423 B2  1/2013  Rosner et al.
(Continued)

FOREIGN PATENT DOCUMENTS

CN  101620581 A  1/2010
CN  103348331 A  10/2013
(Continued)

OTHER PUBLICATIONS

Rob Callaghan,"ULLtraDIMM SSD Overview",Jun. 9, 2014:total 25 pages.
(Continued)

*Primary Examiner* — Michael Sun
(74) *Attorney, Agent, or Firm* — Kilpatrick Townsend & Stockton LLP (57) ABSTRACT A storage apparatus accessed by using a memory bus is disclosed. The apparatus includes an interface controller, a storage module, a storage controller, a command register, a status register, and a buffer. In addition, the interface controller can be electrically connected to a memory module interface of a computer system. The interface controller receives an access command for accessing the storage module sent by a CPU. The interface controller writes the access command into the command register, and records a current access status or result by using the status register. The storage controller performs status setting on the status register according to the access command in the command register, and performs a corresponding read/write operation on the storage module.

12 Claims, 3 Drawing Sheets (51) Int. Cl.
*G06F 3/06* (2006.01)
*G06F 13/16* (2006.01)
*G06F 13/24* (2006.01)
*G06F 13/42* (2006.01)

(52) U.S. Cl.
CPC ........ *G06F 3/0688* (2013.01); *G06F 13/1673* (2013.01); *G06F 13/24* (2013.01); *G06F 13/4022* (2013.01); *G06F 13/4282* (2013.01); *G06F 2213/0026* (2013.01); *G06F 2213/24* (2013.01); *G06F 2213/2806* (2013.01)

(56) References Cited

U.S. PATENT DOCUMENTS

| | | | |
|---|---|---|---|
| 9,898,218 B2* | 2/2018 | Healy | G11C 7/1045 |
| 2003/0084231 A1 | 5/2003 | Yoshimura | |
| 2012/0110259 A1 | 5/2012 | Mills et al. | |
| 2013/0086311 A1 | 4/2013 | Huang et al. | |
| 2014/0013045 A1* | 1/2014 | Crossland | G06F 12/0866 711/105 |
| 2014/0237176 A1 | 8/2014 | Takefman et al. | |
| 2014/0237205 A1* | 8/2014 | Takefman | H03M 13/05 711/162 |
| 2015/0269100 A1* | 9/2015 | Qawami | G06F 1/12 710/308 |
| 2016/0098365 A1* | 4/2016 | Bshara | G06F 13/105 710/104 |

FOREIGN PATENT DOCUMENTS

| | | |
|---|---|---|
| CN | 203838698 U | 9/2014 |
| CN | 104951412 A | 9/2015 |
| WO | 2012106806 A1 | 8/2012 |
| WO | 2015047266 A1 | 4/2015 |

OTHER PUBLICATIONS

Xuyang Lee,"Took over the Fusion-io flash enterprise business expansion",Computer world, vol. 41,2014,total 2 pages. with English translation.

* cited by examiner

STORAGE APPARATUS ACCESSED BY USING MEMORY BUS

CROSS-REFERENCE TO RELATED APPLICATIONS

This application is a continuation of International Application No. PCT/CN2016/070062, filed on Jan. 4, 2016, which claims priority to Chinese Patent Application No. 201510308517.1, filed on Jun. 6, 2015. The disclosures of the aforementioned applications are hereby incorporated by reference in their entireties.

TECHNICAL FIELD

The present invention relates to the field of communications technologies, and in particular, to a storage apparatus accessed by using a memory bus.

BACKGROUND

With the development of information technologies, and especially popularization of the Internet, various types of data volumes grow rapidly, among which video data accounts for a main part. A storage system having a large capacity and high performance is urgently required, so that the data is effectively stored and rapidly accessed.

As a mature technology, a conventional hard disk drive has low costs and a large capacity. However, the hard disk drive has a performance bottleneck and relatively high power consumption, and is gradually replaced by a solid state disk. A solid state disk stores data by using a non-volatile semiconductor memory. Currently, a non-volatile memory such as a flash memory is used, which has advantages in performance, power consumption, and reliability. However, due to high costs, the flash memory is usually used as a buffer of the hard disk drive. With continuous improvements of the semiconductor process, costs of the flash memory are steadily decreased. Therefore, the flash memory would take place of the hard disk drive sooner or later.

A common form of the solid state disk (SSD) is similar to the hard disk drive. For example, both the solid state disk and the hard disk drive use an SATA (Serial Advanced Technology Attachment) interface or an SAS (Serial Attached Small Computer System Interface) interface, have a size of 2.5 or 3.5 inches, and may be connected to a computer system by using an SATA or SAS cable, or may be directly inserted into a hard disk slot on a server.

The solid state disk usually includes a controller, a buffer, and a flash memory. The controller is connected to the computer system by using the SAS/SATA interface. The buffer is configured to temporarily store data to be written into the flash memory or data read from the flash memory, or may be used as a memory of the controller to store code and data required for running the controller (where the controller has a CPU). As a storage medium, the flash memory is configured to store all data of the solid state disk and can accept a read/write access of the controller. The solid state disk of this form has a large volume, and a bandwidth of the SAS/SATA interface usually does not exceed 6 Gbps, resulting in low performance.

Another common form of the solid state disk is a solid state disk using a PCIe (Peripheral Component Interconnect express) plug-in card. A difference between the solid state disk of this form and the solid state disk using the SATA or SAS interface is that interfaces between the solid state disks and a computer system are different. However, inner structures thereof are basically the same. A signal rate of a PCIe interface may reach 8 Gbps and a bit width may be 16 bits. Therefore, a bandwidth may reach 128 Gbps and a delay is low. The solid state disk of this form still has a relatively large volume, and a computer system has relatively few PCIe slots. Consequently, improvements in an installation density and a capacity are limited.

In the prior art, to resolve the problem of a small installation density and a small capacity, a solid state disk in a memory module form is further used, so that in a server having a same volume, more solid state disks can be installed, thereby increasing the storage capacity.

In the prior art, a flash memory stripe in a memory module form is used to resolve the problem of the installation density and capacity of the solid state disk. Because the flash memory stripe is directly installed in a memory module slot, the installation is convenient. In addition, space is saved and a storage density is high. However, in the prior art, a CPU directly accesses a flash memory, that is, the CPU directly sends a target address, a command, and the like by using a signal cable within an access period, a storage controller forwards the signal to a storage module, and the storage module receives the signal and performs a corresponding operation. In such an access manner, the storage module in the storage apparatus is directly mapped to an addressing space of the CPU. Therefore, a storage capacity of the storage apparatus is limited by an addressing space range of the CPU. For example, if a 300 GB flash memory is applied to a CPU whose addressing range is only 4 GB, actual use of the 300 GB flash memory does not exceed 4 GB. For another example, if an addressing range of a CPU is 1 TB, a total capacity of a solid state disk cannot exceed 1 TB. This access manner limits a storage capacity of a device.

SUMMARY

In view of this, embodiments of the present invention provide a storage apparatus accessed by using a memory bus, and the storage apparatus mentioned in the present invention not only includes a flash memory, but may also include a non-volatile storage medium such as a phase change memory or a variable resistive memory. By additionally setting a command register and a status register, an indirect access manner of using a register is used, so that a storage data access space is no longer limited by an addressing space provided by a CPU.

According to a first aspect of the embodiments of the present invention, a storage apparatus accessed by using a memory bus is provided, where the apparatus includes an interface controller, a storage module, and a storage controller; the apparatus further includes a command register and a status register; the interface controller can be electrically connected to a memory module interface of a computer system; the interface controller is configured to receive an access command for accessing the storage module sent by a CPU; the interface controller is configured to write the access command into the command register; and the storage controller is configured to perform a corresponding read/write operation on the storage module according to the access command in the command register.

With reference to the first aspect, in a first possible implementation of the first aspect, the apparatus further includes: a switching control register, a read buffer, and a write buffer, where the read buffer is configured to store data that has been read from the storage module; and the write buffer is configured to store data to be written into the storage module; the switching control register is configured to: according to a mode register set MRS command sent by the CPU, in a process of the performing a corresponding read/write operation on the storage module: switch between the command register and the read buffer, so that either of the command register and the read buffer is electrically connected to the memory module interface of the computer system; or switch between the command register and the write buffer, so that either of the command register and the write buffer is electrically connected to the memory module interface of the computer system.

With reference to the first aspect or with reference to the first possible implementation of the first aspect, in a second possible implementation of the first aspect, the switching control register is configured to connect the read buffer, the write buffer, and the command register to the memory module interface of the computer system in a time division multiplexing manner.

With reference to the first aspect or with reference to any one of the foregoing possible implementations of the first aspect, in a third possible implementation of the first aspect, start addresses of the read buffer, the write buffer, and the command register in an addressing space of the CPU are the same.

With reference to the first aspect or with reference to any one of the foregoing possible implementations of the first aspect, in a fourth possible implementation of the first aspect, the access command includes a logical block addressing LBA, a data length, and a read/write command that are used by the CPU to access to the storage module.

With reference to the first aspect or with reference to any one of the foregoing possible implementations of the first aspect, in a fifth possible implementation of the first aspect, the storage apparatus further includes the status register, where the status register is configured to indicate whether a current working status of the storage module is idle or busy, the idle state indicates that the storage module currently does not perform a read/write operation, and the busy state indicates that the storage module is currently performing a read/write operation.

With reference to the first aspect or with reference to any one of the foregoing possible implementations of the first aspect, in a sixth possible implementation of the first aspect, the storage apparatus is installed in a memory module slot of the computer system, and the interface controller is electrically connected, by using the storage apparatus, to the memory module interface provided by the CPU.

With reference to the first aspect or with reference to any one of the foregoing possible implementations of the first aspect, in a seventh possible implementation of the first aspect, when the computer system further includes a dedicated controller, the storage apparatus is installed in the memory module slot of the computer system, and the interface controller is electrically connected to a memory module interface provided by the dedicated controller of the computer system.

With reference to the first aspect or with reference to any one of the foregoing possible implementations of the first aspect, in an eighth possible implementation of the first aspect, the interface controller is connected to the dedicated controller, and the dedicated controller is connected to the CPU by using a peripheral component interconnect PCI quick path.

With reference to the first aspect or with reference to any one of the foregoing possible implementations of the first aspect, in a ninth possible implementation of the first aspect, the apparatus further includes an electrically erasable programmable read only memory EEPROM, and the EEPROM includes a type identifier of the storage apparatus, so that when the computer system is started, the CPU can identify, according to the type identifier, a storage type of a storage apparatus being accessed by the CPU.

With reference to the first aspect or with reference to any one of the foregoing possible implementations of the first aspect, in a tenth possible implementation of the first aspect, the interface controller is further configured to: after a read/write operation of the storage apparatus is completed, report, to the CPU by using an interrupt signal, that the read/write operation is completed, where the interrupt signal is selected, by a user according to a preset rule, from electrical signals corresponding to the memory module interface.

With reference to the first aspect or with reference to any one of the foregoing possible implementations of the first aspect, in an eleventh possible implementation of the first aspect, the memory module interface of the computer system includes a DDR (double data rate) interface, a DDR2 interface, a DDR3 interface, or a DDR4 interface.

According to a second aspect of the embodiments of the present invention, a computer system is provided, where the system includes the storage apparatus according to any possible implementation of the first aspect.

According to the technical solutions provided in the embodiments of the present invention, the storage apparatus can be electrically connected to the memory module interface of the computer system and the storage apparatus has a relatively small size, so that space is saved and more storage apparatuses may be installed in the computer system, thereby improving an installation density and a storage capacity of the storage apparatus. The storage apparatus is directly accessed by using the memory module interface, so that a bandwidth is high and a CPU read/write data delay is relatively small. By additionally setting the command register and the status register, a storage data access space is no longer limited by an addressing space provided by the CPU.

DESCRIPTION OF EMBODIMENTS

Embodiments of the present invention provide a storage apparatus accessed by using a memory bus and a system.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The storage apparatus provided in the present invention includes a non-volatile memory such as a flash memory, a phase change memory PCRAM, or a variable resistive memory ReRAM. Because principles of read/write operations of these memories in a computer system are the same, specific implementations are mostly equivalents and replacements of the principles. To avoid redundant descriptions, the following uses only a flash memory module as an example.

Figure 1:
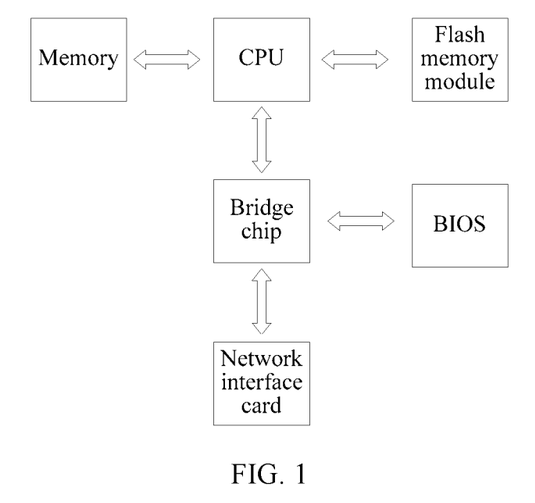
FIG. 1 is a schematic block diagram of an application of a flash memory module in combination with specific hardware according to an embodiment of the present invention.

As shown in FIG. 1, FIG. 1 is a schematic block diagram of an application of a flash memory module in combination with specific hardware according to an embodiment of the present invention. A common computer system structure includes: a CPU, a memory, a bridge chip, a network interface card, a BIOS, a flash memory module, and the like. They work together to complete data processing of the computer.

Currently, common CPUs are all integrated with memory controllers. For example, an x86 processor may be directly connected to a memory module. To improve performance and a memory capacity, multiple memory channels are generally supported, and each memory channel may also support multiple memory modules. For example, an x86 processor supports four memory channels, and each channel supports a maximum of three memory modules. Therefore, the processor may support 12 memory modules in total. If a capacity of each memory module is 16 GB, a total capacity is 192 GB.

After years of development and upgrading of memory modules, currently, double data rate DDR3 (Double Data Rate 3) interfaces are the mainstream. For the DDR3 interface, a rate may reach 1.6 GT/s, a data line width is 64 bits, and a total bandwidth is (64*1.6)/8=12.8 GB/s. DDR4 interfaces are also becoming popularized. The following uses a memory module of the DDR3 interface as an example for description.

The DDR3 interface includes the following 18 groups of signals (the DDR3 memory module has a total of 240 pins, that is, signal contacts):

1. address signal A[0:15], used to provide an address of a memory chip, for example, a row address and a column address;

2. BA[2:0]: a bank address, which is used to select a logical bank inside the memory chip, where a bank may be understood as a subunit of the memory chip to some extent;

3. CK0 and CK0#: differential clocks, which provide a time sequence synchronization function of memory chip access;

4. CKE[0:1]: a clock enabling signal;

5. ODT[0:1]: a signal termination enabling signal;

6. Par_In: a parity bit of the address signal, a write signal WE#, a row gating signal RAS#, and a column gating signal CAS#;

7. RAS#, CAS#, and WE#: a row gating signal, a column gating signal, and a write signal respectively, which are used to be combined into various operation command words;

8. RESET#: a reset signal;

9. CS[3:0]#: a chip select signal;

10. SA[2:0], which is used to configure I2C addresses of an electrically erasable programmable read only memory EEPROM (Electrically Erasable and Programmable Read Only Memory) and a temperature sensor on the memory module;

11. SCL and SDA: I2C bus signals, which are connected to the EEPROM and the temperature sensor on the memory module;

12. CB[7:0]: a data check signal;

13. DQ[63:0]: a data signal;

14. DQS[8:0] and DQS[8:0]#: data gating signals;

15. DM[8:0]: a data mask signal;

16. Err_Out#: at a low level, it indicates that an error occurs in a check on address and command signals;

17. EVENT#: at a low level, it indicates that a temperature of the memory module exceeds a threshold; and 18. power and ground: a power signal includes a 1.5 V core voltage, a 0.75 V reference voltage, and a 0.75 V termination voltage of the memory chip, and 3.3 V working voltages of the EEPROM and the temperature sensor.

The flash memory module in the present invention uses a shape and interface signals of a memory module, so that the flash memory module may be directly inserted into an existing memory module slot by modifying only software without any modification to hardware of the computer system, and detailed descriptions are as follows.

The flash memory module uses a dual inline memory module DIMM (Dual Inline Memory Module) shape that is similar to the shape of a memory module, and may be inserted into an existing memory module slot. A DDR3 memory module slot has 240 signal contacts in total. However, the flash memory module only needs to implement some necessary signals, for example, address signals A[0:15] and BA[2:0], a data signal DQ[63:0], control signals CS[3:0]#, RAS#, CAS#, and WE#, a power signal, and a clock signal. Some signals such as check signals CB[7:0] and Par_In are optional, and signal contacts of these signals may be connected, may be unconnected, or may be connected but not used.

The memory module has an I2C bus interface, including SCL, SDA, and an address signal SA[2:0]. The I2C bus interface is configured to connect to an EEPROM and a temperature sensor on the memory module. The EEPROM stores some parameters of the memory module, such as a storage type, a memory module specification, a storage capacity, a data bus width, a time sequence parameter, and a buffer capacity parameter. The temperature sensor is used to detect a temperature of the memory module, and report an alarm when the temperature exceeds a threshold. The flash memory module in the present invention also has an EEPROM, which stores information basically the same as that stored in the EEPROM on the memory module. However, because a module type of the flash memory module is different from that of the memory module, a value of a third byte (DRAM Device Type) of the EEPROM may be defined. For example, if a type identifier of the DDR3 is 0x0B, a type identifier of the flash memory may be defined as 0x10, indicating a flash memory. During specific implementation, a byte location and a value definition of the EEPROM may be flexibly set. When the computer system is started, the BIOS (Basic Input/Output System) initializes a CPU and a peripheral, the CPU may read the foregoing values from the EEPROM of the flash memory module, so as to identify whether the module is a common DDR3 memory module or a flash memory module, and perform different processing. Descriptions are as follows.

Figure 2:
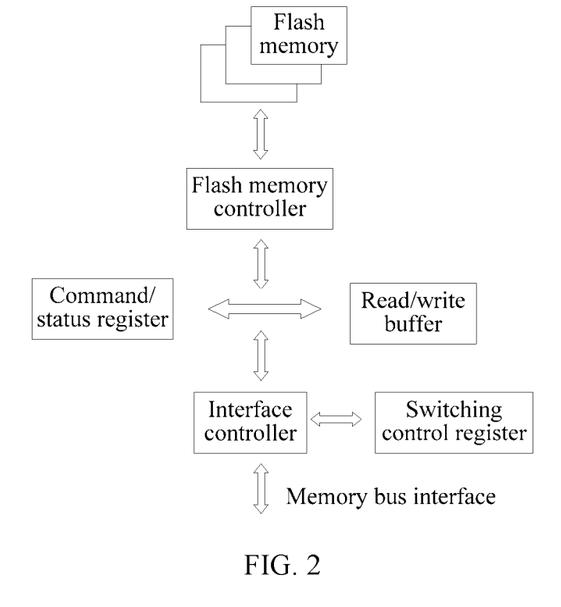
FIG. 2 is a schematic diagram of a logical structure of a flash memory module according to an embodiment of the present invention.

As shown in FIG. 2, FIG. 2 shows a logical structure of a flash memory module according to an embodiment of the present invention. The logical structure of the flash memory module includes: an interface controller, a command register, a status register, a read/write buffer, a switching control register, a flash memory controller, a flash memory, and the like. The interface controller, the switching control register, the command/status register, and the flash memory controller may be integrated into a same chip. Functions of the modules are as follows.

The interface controller is connected to a memory bus. A CPU delivers various read/write commands according to a memory module interface time sequence. The interface controller decodes the command, identifies a read command, a write command, or a mode register set command, and completes a corresponding read/write operation with reference to an address signal and a data signal.

Generally, the command and status registers are two types of registers as follows: the status register is read-only and the command register is write-only. They may share an address, and the command register and the status register may be accessed alternatively. The status register and the command register may be distinguished by using a read/write command, and therefore no additional address is occupied. The flash memory controller on the flash memory module sets content of the status register. There are two 64-bit command registers. Content of a first command register includes a 48-bit start logical block address LBA (logical block address) (which is used to provide an interface to software and is equivalent to a start address), a 16-bit read/write length (which indicates a volume of data that can be read/written). Content of a second command register is an operation command, which may be selected to be the same as an ATA (Advanced Technology Attachment) command set. For example, Read Sector is 0x20, Read Multiple is 0xC4, Write Sector is 0x30, and Write Multiple is 0xC5. The status register includes at least two bits and is configured to store a working status of the flash memory module, such as busy or idle, or whether data is erroneous.

For the read/write buffer, the read buffer and the write buffer may be physically located in a same storage chip, or may be separately located in two different storage chips. In both cases, the read buffer and the write buffer are used in a time division multiplexing manner. The read buffer and the write buffer may belong to a same buffer address space, and the buffer space may be read or written in a time division multiplexing manner. Multiple buffer spaces may exist. The read/write buffer is configured to store data to be written into the flash memory or data read from the flash memory. The read/write buffer may be implemented in multiple manners. For example, two independent chips may be separately used as the read buffer and the write buffer. Alternatively, a same chip may be used, and the chip is divided into two areas, which are separately used as the read buffer and the write buffer. In this case, the CPU may further send a corresponding read/write signal during access. In addition, the buffer space is within an addressing space of the CPU, the switching control register switches between the read/write buffer and the command register according to a command written by the CPU and performs address translation (a read/write address sent by the CPU is converted into a corresponding address of the read/write buffer).

In some embodiments, the apparatus in the present invention may further include a switching control register, which is a newly added register in the present invention and is configured control switching between the command/status register and the read/write buffer. The switching control register controls a multiplexer by using an MRS command delivered by the CPU, to enable, at any moment, only one of the read buffer, the write buffer, the command register, or the status register to be connected to a memory module interface of a computer system. During specific implementation, switching is performed between the buffers and the registers in a time division multiplexing manner. The read buffer and the write buffer are usually in a same address space. The command register and the status register also have a same address space or partially overlapping address spaces.

The flash memory controller performs a corresponding operation on the flash memory according to content of the command register. For a read operation, the flash memory controller reads data from the flash memory and stores the data into the read buffer. For a write operation, the flash memory controller writes content of the write buffer into the flash memory. After the operation is completed, the flash memory controller sets a status bit of the status register, so that when the CPU queries the status register, the CPU may know whether the operation is completed or an error occurs during the operation. The flash memory controller further needs to further implement mapping from the LBA to a physical address of the flash memory, and implement functions such as wear leveling and bad block management of the flash memory, so as to ensure reliability.

The flash memory is configured to store data.

Figure 3:
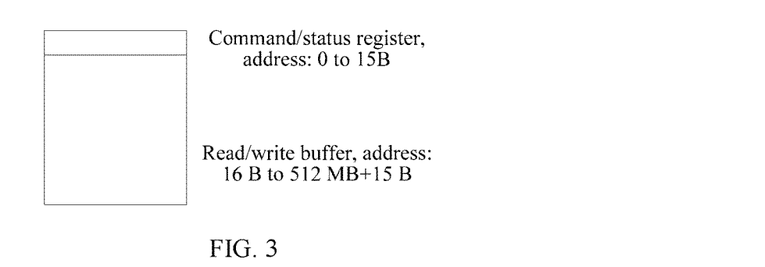
FIG. 3 is a schematic diagram of allocating, by a CPU, an address to a single flash memory module according to an embodiment of the present invention.

To be not limited by the addressing space of the CPU, the CPU in accordance with the disclosure provides an address, a data length, and a command to the command/status register, and indirectly accesses the flash memory by using the command/status register. For example, the command register has two 64-bit registers, and the status register has one 64-bit register, so that there are three 64-bit registers in total. However, because the status register and the command register share an address, the address has only 2*8=16 bytes. In addition, the read/write buffer also occupies a part of the addressing space. An access length is 16 bits, which is equivalent to that a maximum access range is 64 K, while a minimum addressing unit of the flash memory is a sector (4 KB). Therefore, a capacity of the read/write buffer needs to be at least 64 K*4 KB=256 MB, and a total capacity of the read buffer and write buffer is at least 512 MB. If one time of access is divided into multiple times of access, a data volume of each read/write is limited, and therefore, the capacity of the buffer may be smaller. Because address spaces of the command/status register and the read/write buffer are allocated by the CPU separately, to avoid an address conflict, the address of the command/status register and the address of the read/write buffer should be staggered. For example, the first 16 bytes are allocated to the command/status register, and the last 512 MB are allocated to the read/write buffer. As shown in FIG. 3, FIG. 3 shows a case in which a CPU allocates an address to a single flash memory according to an embodiment of the present invention. If the read buffer and the write buffer multiplex an address, only an address space of 256 MB is required.

Figure 4:
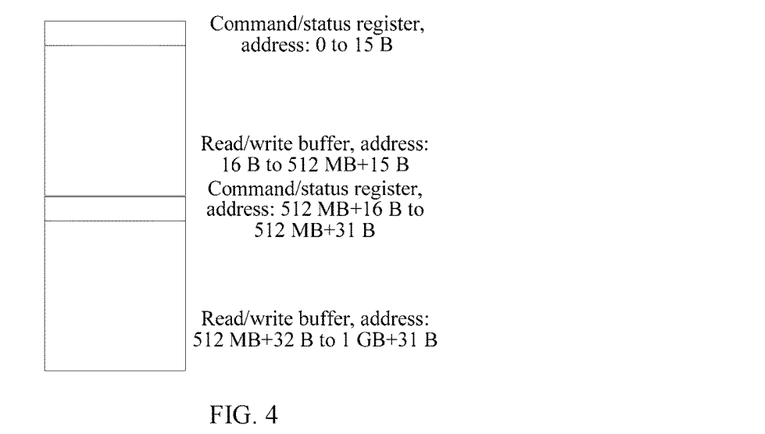
FIG. 4 is a schematic diagram of allocating, by a CPU, addresses to two flash memory modules according to an embodiment of the present invention.

However, a server generally has a high requirement on a flash memory capacity, and therefore a same server needs multiple flash memory modules. If the multiple flash memory modules are installed on a memory bus at the same time, addresses of the multiple flash memory modules are continuously arranged. However, because the flash memory modules are continuously used, addresses of read/write buffers in the multiple flash memory modules are discontinuous and are separated by command/status registers. Because the addresses are discontinuous, when the CPU needs to access the multiple flash memory modules at the same time, access cannot be completed in one time but has to be completed in multiple times. Consequently, data read and write performance is affected. As shown in FIG. 4, FIG. 4 is a schematic diagram of allocating, by a CPU, addresses to two flash memory modules according to an embodiment of the present invention.

By means of this address allocation manner, address spaces of the read/write buffers of the multiple flash memory modules are discontinuous. When accessing the buffers of the multiple flash memory modules, the CPU needs to skip address spaces in which the command/status registers are located. Consequently, complexity of a program design is increased and access performance is also affected.

Therefore, the address of the command/status register and the address of the read/write buffer may be overlapped. For a case in which multiple flash memory modules are used at the same time, in the solution of the present invention, a switching control register may be used to control time division multiplexing access. For example, at one moment, the CPU accesses the command register or the status register, while at another moment, the CPU accesses the read buffer or the write buffer by using a same address. In addition, optimally, the switching control register does not occupy the address space, so as to avoid a problem similar to the foregoing problem that the addresses of the read/write buffers are discontinuous.

A memory module interface supports a special command "mode register set (Mode Register Set, MRS)", which is used to perform initialization configuration on memory chips on a memory module. For example, the command is used to configure burst access sequences, lengths, and delay parameters of the memory chips. When a memory module interface signal is a combination of "CS# at a low level, RAS# at a low level, CAS# at a low level, and WE# at a low level", the command is generated, and an address signal on an address bus is used as data to be written into a mode register of the memory chip. There are four mode registers in total, which are respectively MR0, MR1, MR2, and MR3. The mode registers are separately used to configure different parameters (a burst access manner, a burst length selection, and DLL enabling control). Each register has 17 bits. Bit 16 to bit 0 respectively correspond to BA2 (standby), BA1, BA0, A13, A12, . . . , and 0. Different mode registers are selected by using combinations of BA1 and BA0. For example, if BA1 and BA0=00, MR0 is selected; if BA1 and BA0=01, MR1 is selected. A13 to A0 correspond to bit13 to bit0 of the mode register in a one-to-one manner. Signals on these address lines are separately written into corresponding bits of the mode register. It can be seen that the mode register does not need an address, but performs addressing by using a combination of control signals; in addition, the mode register uses signals on address lines as data to be written into the mode register. Therefore, a requirement on the switching control register is satisfied and an existing "mode register set" (MRS) command may be used to set content of the mode register.

Figure 5:
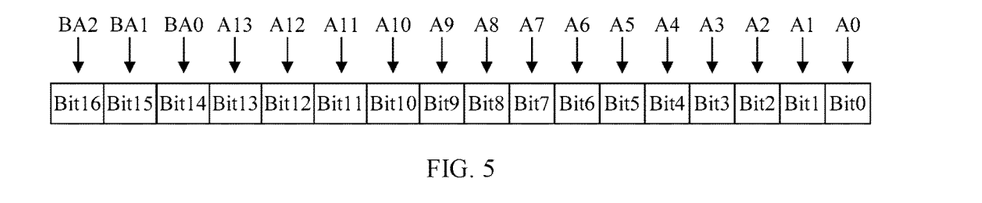
FIG. 5 is a schematic diagram of a format of a mode register according to an embodiment of the present invention.

Another advantage of implementing switching by using the switching control register is high speed, because the switching control register performs access by using the memory module interface, and a clock rate may be above 800 MHz. If an I2C bus of the memory module interface is used to complete the operation, a clock rate of the memory module interface is too slow. The clock rate is only 400 KHz. Content of the mode register is shown in FIG. 5. FIG. 5 is a schematic diagram of a format of a mode register according to an embodiment of the present invention.

In the present invention, only one mode register is required, and the mode register is used as the switching control register. Using MR0 as an example, for example, when bit0 of MR0 is set to 0, it indicates that the memory module interface is connected to the command/status register; when bit0 of MR0 is set to 1, it indicates that the memory module interface is connected to the read/write buffer.

Figure 6:
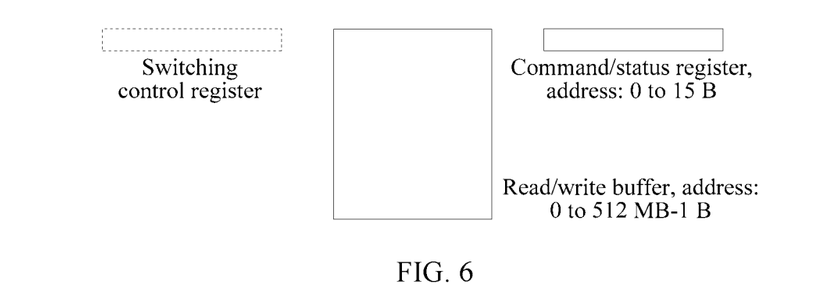
FIG. 6 is a schematic diagram of overlapping address allocation of a flash memory module according to an embodiment of the present invention.

According to the foregoing descriptions, allocation of the address of the command/status register and the address of the read/write buffer is shown in FIG. 6. FIG. 6 is a schematic diagram of overlapping address allocation of a flash memory module according to an embodiment of the present invention. In FIG. 6, the switching control register is represented by using a dashed line block, to indicate that the switching control register does not occupy the address space.

A function that needs to be finally implemented by the flash memory is that a CPU can perform a data read/write operation on the flash memory. The following separately describes communication procedures of a read operation and a write operation in detail.

A read operation on the flash memory module is performed according to the following steps:

(1) the CPU sets the switching control register by using an MRS command, to make bit0=0 and switch the memory module interface to the command/status register;

(2) the CPU writes a start LBA, a sector length, and an operation command of the to-be-read flash memory module into the command register, for example, an address allocated by the CPU to the register on the flash memory stripe is 0 to 15;

(3) the flash memory controller receives the command and the address of the command register in step (2) and sets, according to the command and the address of the command register, a flag bit in the status register to "busy" first, and then starts to read data from the flash memory and stores the data into the read buffer, where a start address is usually 0, but is not limited to 0;

(4) after completing data reading and storing the data into the read buffer, the flash memory controller sets the flag bit of the status register to "idle";

(5) the CPU continuously reads the status bit of the status register after sending a read command, and therefore, after detecting that the state is changed from busy to idle (for example, 0 indicates idle and 1 indicates busy), the CPU sets the switching control register by using an MRS command, to make bit0=1 and switch the memory module interface to the read/write buffer;

(6) the CPU extracts data from the read buffer and stores the data into a memory of the CPU for subsequent processing; and (7) the CPU sets the switching control register by using an MRS command, to make bit0=0 and switch the memory module interface to the command/status register to prepare for performing a next read operation.

A write operation on the flash memory module is performed according to the following steps:

(1) the CPU sets the switching control register by using an MRS command, to make bit0=0 and switch the memory module interface to the read/write buffer;

(2) the CPU sends, to the write buffer, data to be written into the flash memory module, where a start address is 0, but is not limited to 0;

(3) the CPU sets the switching control register by using an MRS command, to make bit0=0 and switch the memory module interface to the command/status register;

(4) the CPU writes, into the command register, a start LBA, a sector length, and an operation command of the flash memory module into which the data is going to be written, for example, an address allocated by the CPU to the register on the flash memory stripe is 0 to 15;

(5) the flash memory controller receives the command and the address written into the command register in step (4), and sets, according to the command and the address of the command register, a flag bit in the status register to "busy" first, and then starts to read data from the write buffer and writes the data into the flash memory, where a start address is usually 0, but is not limited to 0;

(6) After completing data migration, the flash memory controller sets the flag bit of the status register to "idle"; and (7) the CPU continuously reads the status bit of the status register after sending a write command, and therefore, after detecting that the state is changed from busy to idle, the CPU prepares for performing a next write operation.

During the foregoing read and write operations, the mode register and bits in the mode register may be flexibly selected according to requirements of a user and a feature of a used computer; eigenvalues of bits in the mode register and eigenvalues of flags "busy" and "idle" in the status register may be set according to requirements of a user and a feature of a used computer.

Whether the flash memory controller completes the read/write operation may be determined by the CPU in the foregoing query manner of continuously reading the status bit of the status register, or in an interrupt manner, thereby saving a time of the CPU. During specific implementation, an interrupt signal may be determined according to a specific signal use situation of a user or a requirement of the user. For example, an EVENT# signal exists on the memory module interface. The signal is originally used to indicate a temperature of the memory module, and becomes a low level after the temperature exceeds a threshold. In the present invention, the signal may be used as an interrupt signal. After completing the read/write operation, the flash memory controller, in one aspect, sets the flag bit of the status register to idle, and in the other aspect, drives EVENT# to be a low level, and initiates interruption to the CPU. After responding the interruption, the CPU reads the status register of the flash memory module (different interruption causes correspond to different bits), and may identify whether the interruption cause is that the temperature exceeds the threshold or that the flash memory controller has completed the read/write operation.

If multiple flash memory modules are installed on a memory channel of the CPU, when a BIOS is started, the BIOS reads a module type from the EEPROM on the flash memory module. After detecting that the type is a flash memory module, the BIOS does not report the flash memory module as a memory to an operating system. For each flash memory module, an address of the command/status register overlaps with an address of the read/write buffer, and does not occupy any additional address space. Therefore, addresses of read/write buffers of the multiple flash memory modules are continuous. If a capacity of a read/write buffer of a first flash memory module is 512 MB and a capacity of a read/write buffer of a second flash memory module is 1 GB, an address range of the read/write buffer of the first flash memory module is 0 to 512 MB−1 and an address range of the second flash memory module is 512 MB to 1.5 GB−1. For the command/status register, an address range of the first flash memory module is 0 to 15, and an address range of the second flash memory module is 512 MB to 512 MB+15. The BIOS may deduce an address range of each read/write buffer and an address range of each command/status register of each flash memory module according to a quantity of flash memory modules and buffer capacity parameters stored in EEPROMs, so as to facilitate addressing during access to data of the flash memory module.

During access to different flash memory modules, different flash memory modules may be on different memory module interfaces or channels, and each of the flash memory modules corresponds to one memory controller. Alternatively, a same memory controller may select a corresponding flash memory module by using multiple chip select signals CS# of a same memory module interface (for example, CS0# indicates that a first flash memory module is selected and CS1# indicates that a second flash memory module is selected). A manner of accessing a flash memory module is the same as a manner of accessing a memory module. Composition structures of the flash memory modules are the same. Each flash memory module has a structure shown in FIG. 2. The CPU processes each flash memory module in a same data processing manner, the only difference is that the CPU first performs the foregoing steps of the read/write operation on different flash memory modules by using different chip select signals.

Figure 7:
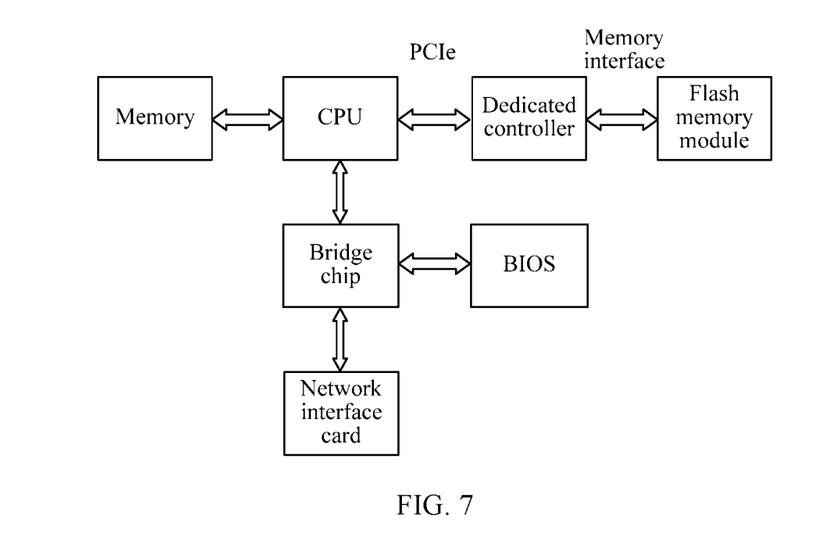
FIG. 7 is a schematic block diagram of an application of another flash memory module according to an embodiment of the present invention.

In addition to being installed in a memory module slot that is directly connected to the CPU, the flash memory module may also be connected to a dedicated controller. In implementation of another embodiment of the present invention, as shown in FIG. 7, FIG. 7 is a schematic block diagram of an application of another flash memory module according to an embodiment of the present invention. A dedicated controller in a computer system is connected to a CPU by using a PCIe interface, and then is connected to the flash memory module by using a memory module interface. If the PCIe interface complies with the PCIe 3.0 specification, a rate is 8 GT/s. When a bit width is 16 bits, a bandwidth is 16 GB/s. The bandwidth is higher than a bandwidth of a DDR3 interface whose width is 64 bits and equivalent rate is 1.6 GT/s. Therefore, the PCIe interface does not become a performance bottleneck. When accessing the flash memory module, the CPU first sends an LBA, a sector length, and a read/write command to the dedicated controller by using the PCIe interface, and the dedicated controller forwards the LBA, the sector length, and the read/write command to the flash memory module by using the memory module interface. The subsequent operations are the same as previously described operations.

The flash memory module in the present invention uses a shape structure of a memory module, so that the memory module has a relatively small size and space is saved. More flash memory modules may be installed in a computer system, thereby improving an installation density of the flash memory and a storage capacity. The flash memory module is directly accessed by using a memory module interface, so that a bandwidth is larger and a data read/write delay of the CPU is smaller. The flash memory module using this structure can be directly inserted into a memory module slot by modifying only corresponding software and without using other hardware. By additionally setting the command register and the status register, a data access space of the flash memory is no longer limited by an addressing space provided by the CPU. The CPU needs to provide only addressing spaces of few registers and addressing spaces of few read/write buffers. For example, by providing an address, a data length, and a read/write command to the command/status register, the CPU can indirectly access the flash memory by using the command/status register. In addition, the command/status register and the read/write buffer can be switched in a time division multiplexing manner by using a "mode register set" command. In addition, because the switching control register does not occupy an addressing space of the CPU, when multiple flash memory modules are installed on a memory bus, a case in which addresses of read/write buffers are discontinuous does not occur, thereby reducing complexity of a program design and improving access performance of the flash memory.

A person of ordinary skill in the art may understand that all or some of the steps of the foregoing methods may be implemented by a program instructing relevant hardware. The program may be stored in a computer readable storage medium. With descriptions of the foregoing embodiments, a person skilled in the art may clearly understand that the present invention may be implemented by hardware, firmware or a combination thereof.

The foregoing embodiments are merely examples of embodiments of the present invention, but are not intended to limit the scope of the present invention. Any modification, equivalent replacement, or improvement made without departing from the spirit and principle of the present invention shall fall within the scope of the present invention.

What is claimed is:

1. A storage apparatus accessed by a memory bus, wherein the storage apparatus comprises:
   an interface controller;
   at least one storage module, and a storage controller coupled to the at least one storage module;
   a switching control register;
   a read buffer configured to store data read from the at least one storage module;
   a command register; and
   a status register; and, wherein
   the interface controller is electrically connectable to a memory module interface of a computer system, and is configured to:
   receive an access command for accessing the at least one storage module sent by a CPU; and
   write the access command into the command register;
   the storage controller is configured to perform a corresponding read/write operation on the at least one storage module according to the access command in the command register;
   the switching control register is configured to: according to a mode register set Mode Register Set (MRS) command sent by the CPU, switch between the command register and the read buffer, so that the command register is first electrically connected to the memory module interface of the computer system and then the read buffer is electrically connected to the memory module interface of the computer system; and
   the command register or the status register is separate and distinct from the at least one storage module.

2. The storage apparatus according to claim 1, further comprising: a write buffer, wherein the write buffer is configured to store data to be written into the at least one storage module; and, wherein
   the switching control register is configured to: according to the mode register set Mode Register Set (MRS) command sent by the CPU,
   switch between the command register and the write buffer, so that the write buffer is first electrically connected to the memory module interface of the computer system and then the command register is electrically connected to the memory module interface of the computer system.

3. The storage apparatus according to claim 2, wherein the switching control register is configured to control switching among the read buffer, the write buffer, and the command register, so that the read buffer, or the write buffer, or the command register is connected to the memory module interface of the computer system.

4. The storage apparatus according to claim 2, wherein start addresses of the read buffer, the write buffer, and the command register in an addressing space of the CPU are the same.

5. The storage apparatus according to claim 1, wherein the storage apparatus further comprises the status register, the status register is configured to indicate whether a current working status of the at least one storage module is in an idle state or in a busy state, wherein the idle state indicates that the at least one storage module currently does not perform a read/write operation, and the busy state indicates that the at least one storage module is currently performing a read/write operation.

6. The storage apparatus according to claim 1, wherein the storage apparatus is installed in a memory module slot of the computer system, and the interface controller is electrically connected, by using the storage apparatus, to the memory module interface provided by the CPU.

7. The storage apparatus according to claim 1, wherein the computer system further comprises a dedicated controller, the storage apparatus is installed in a memory module slot of the computer system, and the interface controller is electrically connected to a memory module interface provided by the dedicated controller of the computer system.

8. The storage apparatus according to claim 7, wherein the interface controller is connected to the dedicated controller, and the dedicated controller is connected to the CPU by using a peripheral component interconnect PCI quick path.

9. The storage apparatus according to claim 1, wherein the apparatus further comprises an electrically erasable and programmable read-only memory EEPROM, the EEPROM comprising a type identifier of the storage apparatus, so that when the computer system is started, the CPU is enabled to identify, according to the type identifier, a storage type of a storage apparatus being accessed by the CPU.

10. The storage apparatus according to claim 1, wherein the interface controller is further configured to: after a read/write operation of the storage apparatus is completed, report, to the CPU by using an interrupt signal, that the read/write operation is completed, wherein the interrupt signal is selected, by a user according to a preset rule, from electrical signals corresponding to the memory module interface.

11. The storage apparatus according to claim 1, wherein the memory module interface of the computer system comprises a DDR interface, a DDR2 interface, a DDR3 interface, or a DDR4 interface.

12. A computer system wherein the computer system comprises the storage apparatus according to claim 1.

* * * * *